(12) United States Patent
Nakagawa et al.

(10) Patent No.: US 7,621,676 B2
(45) Date of Patent: Nov. 24, 2009

(54) OPTICAL CONNECTOR

(75) Inventors: Hiroshi Nakagawa, Osaka (JP); Takeshi Isoda, Osaka (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 12/408,548

(22) Filed: Mar. 20, 2009

(65) Prior Publication Data

US 2009/0245734 A1   Oct. 1, 2009

(30) Foreign Application Priority Data

Mar. 28, 2008  (JP) .............................. 2008-086786

(51) Int. Cl.
*G02B 6/36* (2006.01)
*G02B 6/38* (2006.01)

(52) U.S. Cl. .............................. 385/81; 385/55; 385/56; 385/58; 385/59; 385/60; 385/62; 385/66; 385/68; 385/70; 385/71; 385/72; 385/75; 385/76; 385/77; 385/78; 385/84; 385/88; 385/89; 385/92

(58) Field of Classification Search .................. 385/59, 385/60, 62, 66, 68, 75, 78, 81, 84, 89
See application file for complete search history.

(56) References Cited

U.S. PATENT DOCUMENTS

| | | | |
|---|---|---|---|
| 4,944,568 A | 7/1990 | Danbach et al. | |
| 5,082,346 A | 1/1992 | Myers | |
| 6,247,851 B1* | 6/2001 | Ichihara ........................ | 385/56 |
| 6,296,399 B1* | 10/2001 | Halbach et al. ............... | 385/81 |
| 6,302,591 B1* | 10/2001 | Nagaoka et al. .............. | 385/59 |
| 6,688,779 B2 | 2/2004 | Nishita ......................... | 385/75 |
| 6,935,790 B2* | 8/2005 | Ozaki ........................... | 385/78 |
| 7,077,576 B2* | 7/2006 | Luther et al. .................. | 385/59 |
| 7,153,041 B2* | 12/2006 | Mine et al. .................... | 385/92 |
| 7,427,164 B2* | 9/2008 | Schempp ...................... | 385/53 |
| 7,510,336 B2* | 3/2009 | Sakaji et al. ................... | 385/88 |
| 2004/0076389 A1 | 4/2004 | Ozaki | |

FOREIGN PATENT DOCUMENTS

EP   0 279 359   8/1988

(Continued)

OTHER PUBLICATIONS

Extended European Search Report issued by the European Patent Office for corresponding European patent application No. 09004027.0, Jul. 2009.

*Primary Examiner*—Ryan Lepisto
(74) *Attorney, Agent, or Firm*—David N. Lathrop

(57) ABSTRACT

An optical connector includes a receptacle body 40 having an engage hole 46 formed in a peripheral wall 45 of a chamber 44, a pigtail body 50 having a base body 51 contained in the chamber 44 and a locking protrusion 56 engaged in the engage hole 46 to attach the pigtail body 50, and a ferrule assembly 60 being inserted in a container 53 in the base body 51 so that the ferrule 62 is positioned in a receptacle cylinder 52, and a spring 70 inserted through an opening 54 in the base body 51 and pressing the ferrule 62 forward, wherein a stopper 73 is formed in the spring 70 as an integral part of the spring 70. A locking part 73b included in the stopper 73 is positioned in a recess 63 in the ferrule 62.

6 Claims, 6 Drawing Sheets

FOREIGN PATENT DOCUMENTS

| | | |
|---|---|---|
| EP | 0 770 891 | 5/1997 |
| EP | 1 143 277 | 10/2001 |
| EP | 1 199 585 | 4/2002 |
| JP | 2001-051156 | 2/2001 |
| JP | 2002-131584 | 5/2002 |

* cited by examiner

OPTICAL CONNECTOR

BACKGROUND ART

The present invention relates to an optical connector used in an in-vehicle LAN, for example, and, in particular, to an optical connector holding a terminal of an optical fiber cable.

FIG. 1 shows a configuration of an optical connector described in Japanese Patent Application Laid Open No. 2002-131584 (filed on May 9, 2002, hereinafter referred to as Document 1), which is one example of a conventional optical connector of this type. In FIG. 1, reference numeral 11 denotes a housing, 12 denotes a stopper, and 13 denotes an optical fiber cord. The optical fiber cord 13 in this example has a first cladding 13b around the perimeter of an optical fiber 13a and a second cladding 13c around the perimeter of the first cladding 13b.

A cord hole 14 for containing the optical fiber cord 13 is formed in the housing 11. An opening 15 is formed on one side of the cord hole 14 for allowing the cord hole 14 to communicate with the exterior. A ferrule 16 holding the optical fiber 13a is formed at an end of the housing 11.

The cord hole 14 includes an entrance hole part 14a and cord holding hole part 14b. A fiber holding hole 16a formed in the ferrule 16 is positioned forward of the cord holding hole part 14b. Reference numeral 17 in FIG. 1 indicates a mating piece to be mated to another optical connector.

The optical fiber cord 13 is inserted through a back end of the cord hole 14, the second cladding 13c is placed in the entrance hole part 14a, and the first cladding 13b is placed in the cord holding hole part 14b. The optical fiber 13a is placed in the fiber holding hole 16a in the ferrule 16. In this state, the stopper 12 is inserted through the opening 15 in the direction orthogonal to the direction in which the optical fiber cord 13 is inserted. As a result, a pair of holding plates 12a of the stopper 12 in each of which a U-shaped slit (not shown in FIG. 1) is formed are engaged in (enter) the first cladding 13b of the optical fiber cord 13. Thus, the stopper 12 positions and fixes the optical fiber cord 13 in the direction of the axis of the optical fiber cord 13.

FIG. 2 shows a configuration of an optical connector disclosed in Japanese Patent Application Laid Open No. 2001-51156 (filed on Feb. 23, 2001, hereinafter referred to as Document 2). An optical connector 20 holding an optical fiber is mated to another optical connector 30 holding a photonic device module in FIG. 2.

The optical connector 20 includes a ferrule assembly 21, a housing 22, a spring cap 23, and a spring 24. The ferrule assembly 21 consists of an optical fiber 25 and a ferrule 26 which is attached to the terminal of the optical fiber 25 passing through the spring 24. The ferrule 26 includes a small diameter part 26a and a large diameter part 26b. A flange 26c is formed in the large diameter part 26b. One end of the spring 24 abuts on the flange 26c.

A chamber 22a accommodating the ferrule assembly 21 is formed in the housing 22 and a stopper 22b is formed in the middle of the chamber 22a. An engage hole 22c is formed in the rear sidewall. A fiber leading part 23a is formed in the spring cap 23 so that the optical fiber 25 can be held. A locking protrusion 23b that engages in the engage hole 22c of the housing 22 is formed on the front end external surface of the fiber leading part 23a. The rear end face 26d of the ferrule 26 and the other end of the spring 24 abut on the front end of the fiber leading part 23a.

The optical connector 20 is assembled by inserting the ferrule assembly 21 from the rear of the housing 22, then passing the optical fiber 25 through the fiber leading part 23a, and fitting the spring cap 23 in the rear of the housing 22.

In an optical connector of this type, it is important to ensure a sufficient pull-out strength so that the optical fiber is not pulled out from the optical connector when an accidental force (pull force) is applied to the optical fiber. In addition, if the optical fiber excessively moves in the direction of the axis of the optical fiber when the optical fiber is pulled, connection loss increases. Therefore, the optical fiber needs to be prevented from being excessively displaced under a pull force.

The conventional optical connector shown in FIG. 1 retains the optical fiber cord 13 so as not to be pulled out by merely digging the stopper 12 into the cladding 13b of the optical fiber cord 13. Therefore, if the optical fiber cord 13 is strongly pulled, the retention can loosen and the optical fiber cord 13 can be significantly moved in its axis direction.

In the conventional optical connector shown in FIG. 2 on the other hand, the rear end face 26d of the ferrule 26 holding the optical fiber 25 abuts on the spring cap 23 to restrict an excessive displacement of the optical fiber 25 when the optical fiber 25 is pulled. However, the spring cap 23 is attached to the housing 22 only by the locking protrusion 23b merely engaging in the engage hole 22c of the housing 22. Therefore, when the optical fiber 25 is strongly pulled, for example, the excessive force can damage the engaging part (the locking protrusion 23b and the engage hole 22c). As a result, the optical fiber 25 (the ferrule assembly 21) can be pulled out.

SUMMARY OF THE INVENTION

An object of the present invention is to provide an optical connector that prevents an optical fiber cable to be pulled out of the optical connector and from being excessively displaced when the optical fiber cable is pulled by an excessive force.

An optical connector according to the present invention includes:

a receptacle body including a front opening into which another optical connector is to be inserted and fit and a chamber communicating with the front opening and opened backward, the receptacle body having an engage hole formed in a peripheral wall surrounding the chamber, the engage hole communicating with the chamber;

a pigtail body including a box-like base body and a receptacle cylinder protruding from the front surface of the base body, the base body being contained in the chamber, the receptacle cylinder being positioned in the front opening, a locking protrusion provided in the base body engaging in the engage hole to attach the pigtail body to the receptacle body;

a ferrule assembly including an optical fiber cable and a ferrule attached to a terminal of the optical fiber cable, the ferrule assembly being inserted in a container formed and opened backward from the rear of the chamber in the base body, and the front end of the ferrule being inserted and positioned in the receptacle cylinder in place;

a spring including a base and a pressing piece extended from one end of the base and bent, the spring made of a plate spring material inserted in the base body through an opening formed in the base body in the direction orthogonal to an insertion direction of the ferrule assembly to communicate with the container, the pressing piece pressing the ferrule forward; wherein an L-shaped stopper is formed in the spring as an integral part of the spring;

the stopper includes an extended part extended from the other end of the base in the insertion direction and a locking part formed by bending an end of the extended part;

the extended part is sandwiched between the peripheral wall and the base body;

the locking part passes through a window formed in the base body and is positioned in a recess formed in an outer surface of the ferrule; and movement of the ferrule assembly in the direction in which the ferrule assembly is pulled out from the base body is restricted by the locking part positioned in the recess.

With the configuration described above, the optical connector of the present invention is capable of ensuring a sufficient pull-out strength of the optical fiber cable to prevent the optical fiber cable from being pulled out of the optical connector when the optical fiber cable is pulled. In addition, the ferrule is not excessively displaced. Therefore, the problem can be prevented that the spring that presses the ferrule is plastically deformed by an excessive displacement of the ferrule and the pressure strength of the spring that biases the ferrule forward (toward the receptacle cylinder) is reduced to impair optical characteristics. Accordingly, stable optical characteristics can be obtained.

The stoppers for ensuring the pull-out strength are integral parts of the spring that presses the ferrule. Therefore, the number of parts and the number of assembly steps are not increased and consequently the optical connector can be fabricated at low costs.

BEST MODES FOR CARRYING OUT THE INVENTION

An embodiment of the present invention will be described below.

Figure 1:
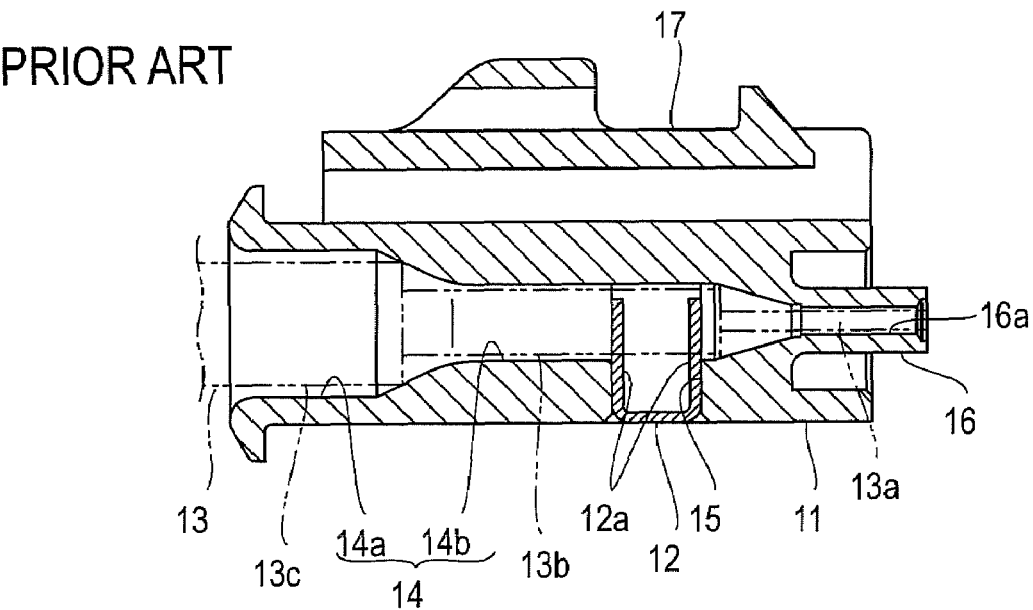
FIG. 1 is a cross-sectional view showing an example of a conventional configuration of an optical connector.
Figure 2:
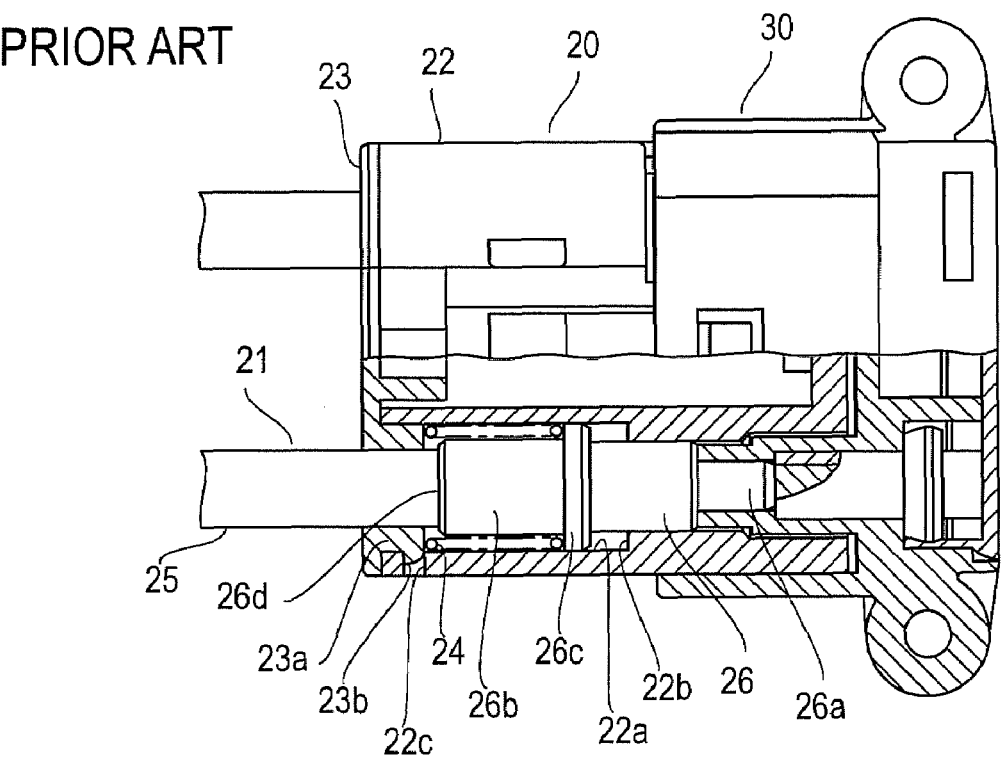
FIG. 2 is a partial cross-sectional view showing another example of a conventional configuration of an optical connector.
Figure 3A:
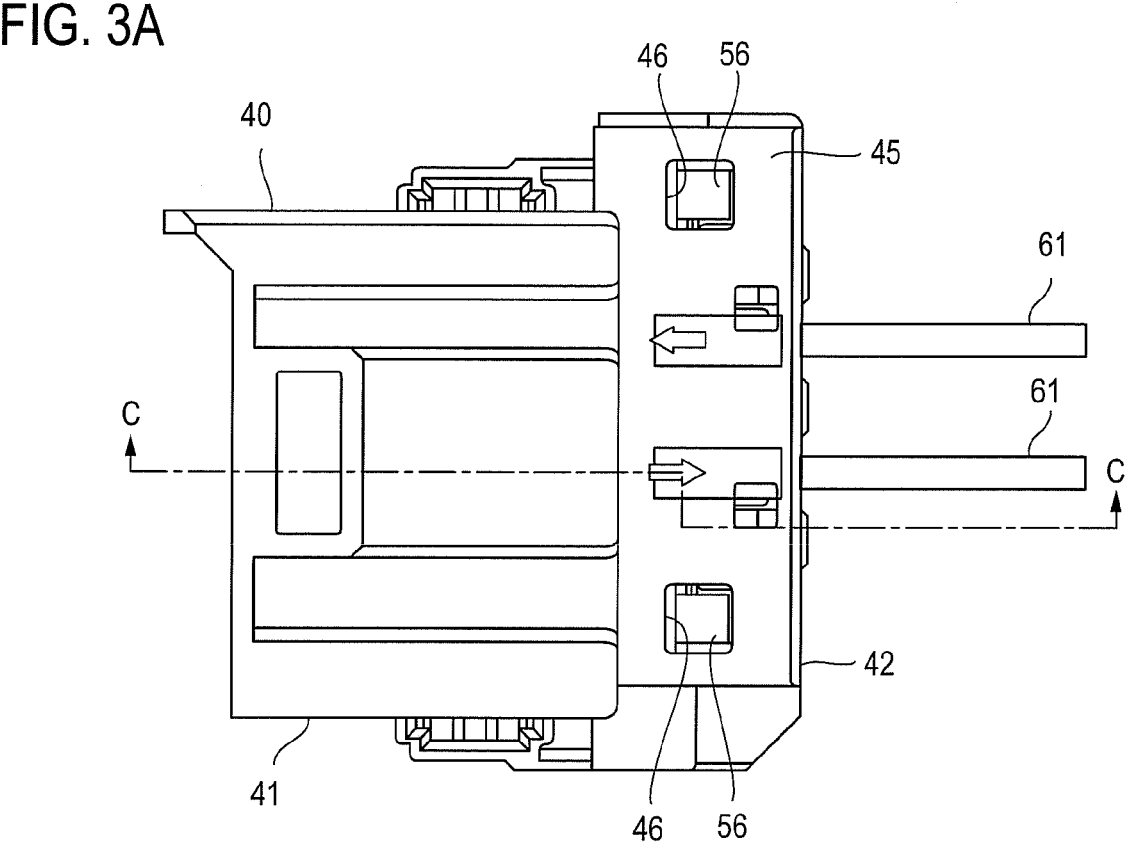
FIG. 3A is a plan view showing an embodiment of an optical connector according to the present invention.
Figure 3B:
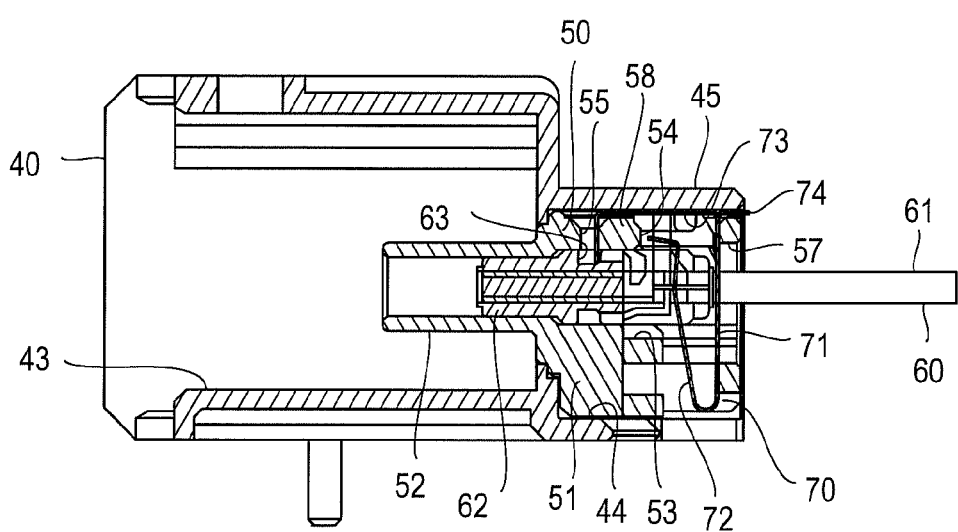
FIG. 3B is a cross-sectional view taken along line C-C in FIG. 3A.
Figure 4:
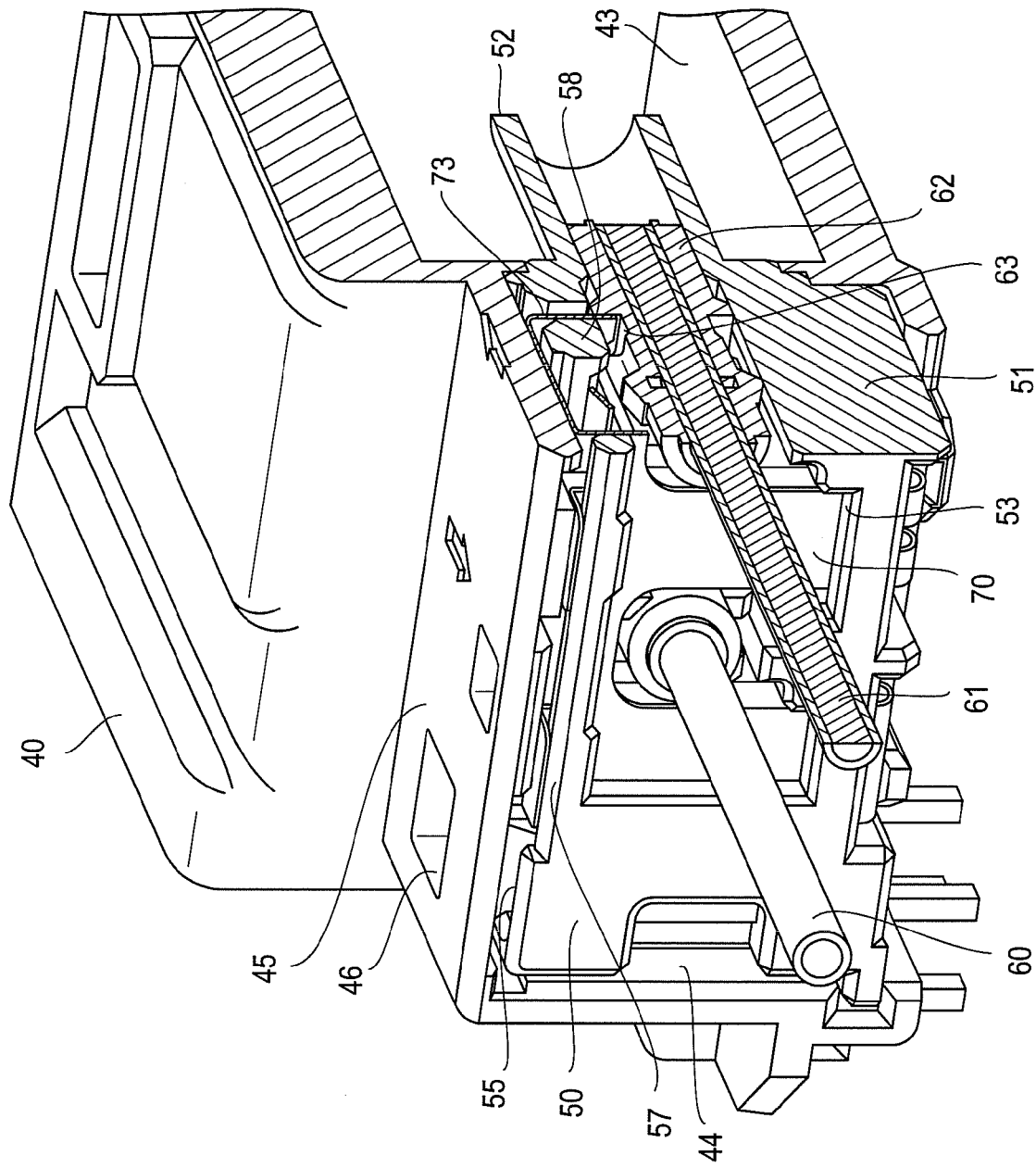
FIG. 4 is a partial cross-sectional perspective view of the optical connector shown in FIG. 3A.
Figure 5A:
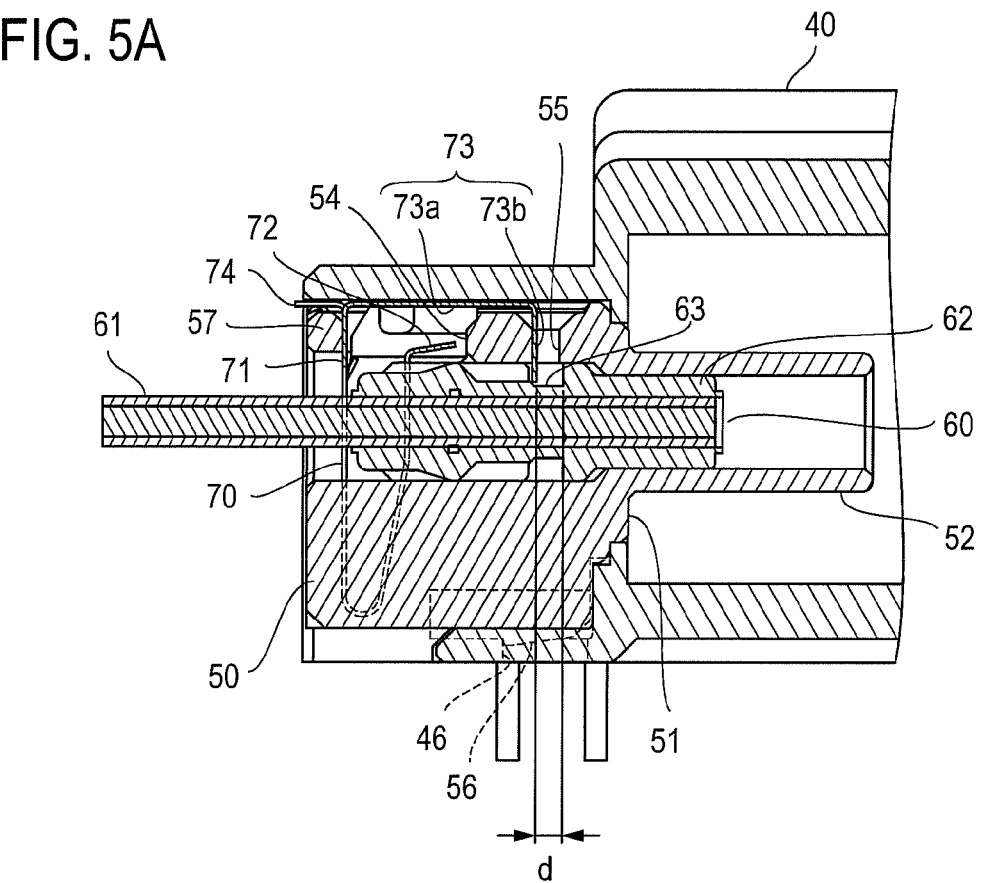
FIG. 5A is a enlarged cross-sectional view of a relevant part of the optical connector shown in FIG. 3A.
Figure 6:
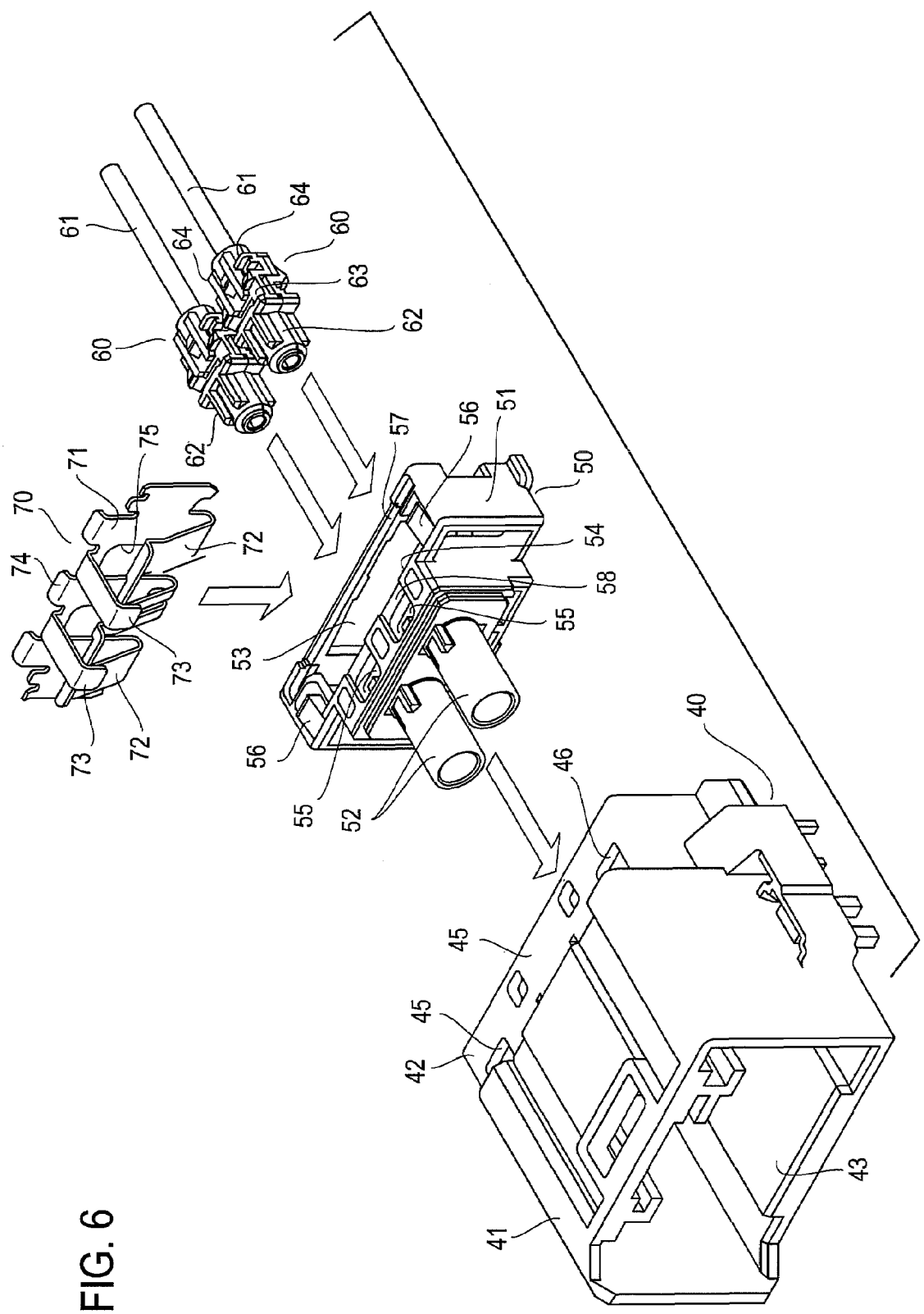
FIG. 6 is an exploded perspective view of the optical connector shown in FIG. 3A.
Figure 7:
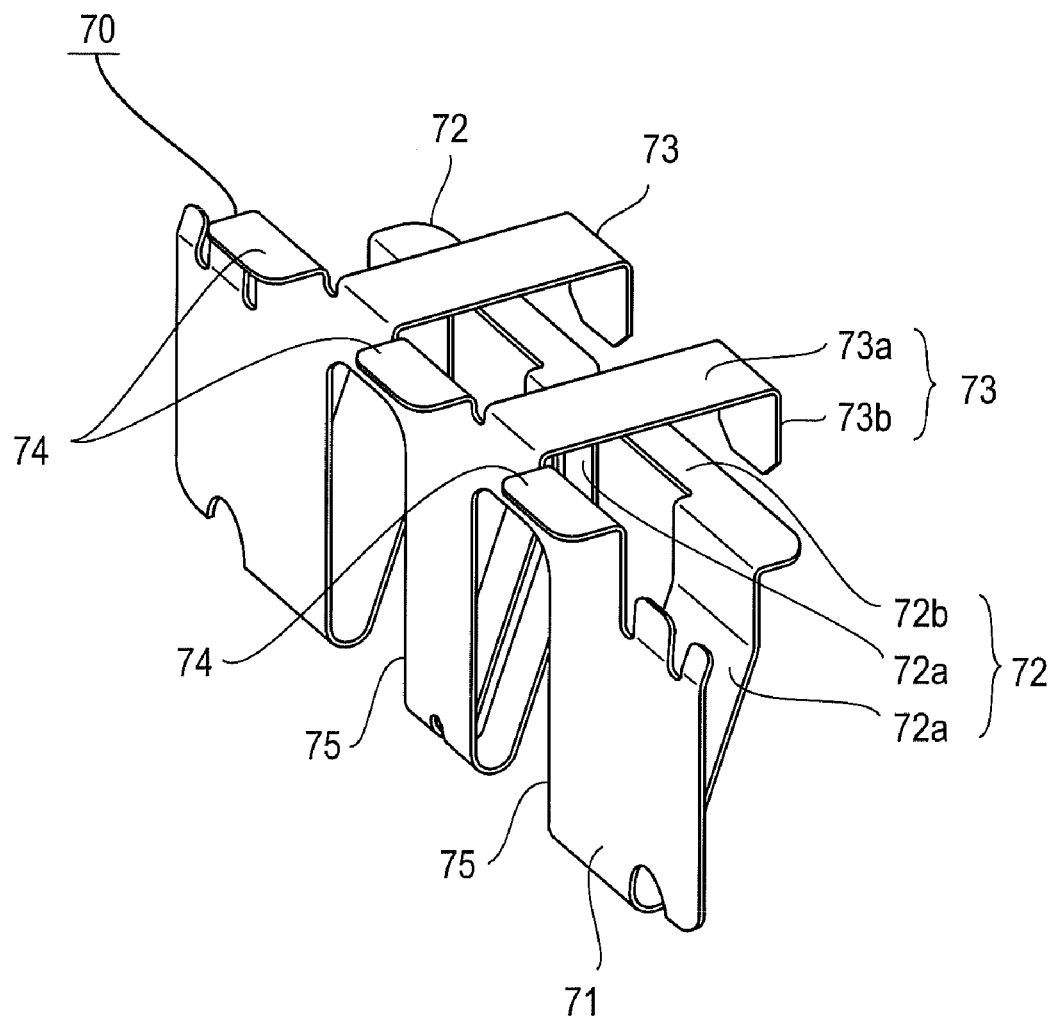
FIG. 7 is an enlarged perspective view of a spring shown in FIG. 6.

FIG. 3A shows an exterior view of an optical connector according to the present invention. FIGS. 3B, 4, and 5A show a cross section structure of the optical connector. FIG. 6 shows the optical connector disassembled into components. In the example, the optical connector includes a receptacle body 40, pigtail body 50, a pair of ferrule assemblies 60, and a spring 70. FIG. 7 shows the spring 70 enlarged.

A configuration of each of the components will be described first.

The receptacle body 40 is made of a resin and includes a front box-like part 41 and a rear box-like part 42 which is connected to the front box-like part and has a height lower than the front box-like part 41. A front opening 43 is formed in the front box-like part 41, into which another optical connector is to be inserted and fit. A chamber 44 opened backward is formed in the rear box-like part 42. The chamber 44 internally communicates with the front opening 43.

Engage holes 46 that communicate with the chamber 44 are formed in a peripheral wall 45 surrounding the chamber 44 of the rear box-like part 42. The engage holes 46 are rectangular in shape and a pair of them are formed in each of the upper and lower opposed surfaces of the peripheral wall 45.

The pigtail body 50 is made of a resin and includes a base body 51 in box-shape and a receptacle cylinder 52 protruding from the front face of the base body 51. In the example, a pair of receptacle cylinders 52 are formed on the front of the base body 51. A container 53 opened backward is formed in the base body 51. The interior space of each of the pair of receptacle cylinders 52 communicates with the container 53.

An opening 54 is formed in the upper surface of the base body 51 so as to communicate with the container 53. A pair of windows 55 are formed forward of the opening 54 (on the receptacle cylinder 52 side) so as to communicate with the container 53. Locking protrusions 56 are formed at both ends of the upper surface of the base body 51 in the width direction across the opening 54. Similarly, to the upper surface, a pair of locking protrusions 56 are formed also on the lower surface of the base body 51.

Each ferrule assembly 60 includes an optical fiber cable 61 and a ferrule 62 attached to a terminal of the optical fiber cable 61. The optical fiber cable 61 is integrated into the ferrule 62 by ultrasonic welding. A recess 63 orthogonal to the axis of the ferrule 62 and extending horizontally is formed in the upper outer surface of the ferrule 62 roughly in the center of the ferrule 62. A pair of press parts 64 protruding laterally are formed on the rear-end perimeter of the ferrule 62.

The spring 70 is made of a plate spring material and, in the example, includes a base 71, a pair of pressing pieces 72 formed by extending and bending one end of the base 71, a pair of stoppers 73 formed by extending and bending the other end of the base 71 at a right angle toward the pressing pieces 72, and three fixing parts 74 formed by extending and bending the other end of the base 71 in the opposite direction from the stoppers 73. The base 71 and the pressing pieces 72 form a substantially V-shape when viewed from a lateral side.

A pair of notches 75, which are sufficiently large for the optical fiber cable 61 to pass through and the rear end of the ferrule 62 to enter, are formed in the base 71. The pressing piece 72 in this example includes a pair of legs 72a and a connecting part 72b that connects the ends of the legs 72a. The gap between the pair of legs 72a is equal to the width of the notch 75 of the base 71, that is, the notch 75 of the base 71 is extended directly to form the gap between the pair of legs 72a.

Each stopper 73 includes an extended part 73a formed by being extended from the other end of the base 71 and a locking part 73b formed by bending the end of the extended part 73a and is generally shaped like a letter L. The pair of stoppers 73 are formed in positions corresponding to the positions of the pair of notches 75 and the three fixing parts 74 are formed so as to be positioned alternately with the stoppers 73. For the plate spring material of the spring 70, for example, a phosphor-bronze plate or spring stainless steel plate is used.

Assembly of the components will be described step by step.

(1) The ferrules 62 of the pair of ferrule assemblies 60 are inserted in the container 53 of the pigtail body 50 from the rear. The front end of each ferrule 62 is inserted in the receptacle cylinder 52 and is positioned in place.

(2) The spring 70 is inserted through the opening 54 in the direction orthogonal to the direction of insertion of the ferrule assemblies 60 and is attached to the pigtail body 50. The spring 70 is inserted in such a manner that the end of the base 71 at which the pressing pieces 72 are formed is inserted first and the base 71 is at the rear of the base body 51 of the pigtail body 50. The base 71 abuts on the internal surface of the back wall 57 of the base body 51 that forms one side of the opening 54 and the press part 64 is pressed by each of the pair of legs 72a of the pressing pieces 72 and the pair of the ferrules 62 are biased forward (toward the receptacle cylinder 52).

The three fixing parts 74 and the extended parts 73a of the pair of stoppers 73 are positioned on the upper surface of the base body 51 and the locking parts 73b of the stoppers 73 pass through the windows 55 formed in the base body 51 and are positioned respectively in the recesses 63 formed in the outer surfaces of the ferrules 62.

(3) The pigtail body 50 to which the pair of ferrule assemblies 60 and the spring 70 are attached as described above is inserted in the receptacle body 40 from the rear and attached to the receptacle body 40. The base boy 51 of the pigtail body 50 is placed in the chamber 44 and the pair of receptacle cylinders 52 are positioned in the front opening 43. The locking protrusions 56 provided in the base body 51 are engaged in the engage holes 46 formed in the peripheral wall 45 surrounding the chamber 44. The engagement firmly fixes the pigtail body 50 to the receptacle body 40 to complete the optical connector.

The three fixing parts 74 of the spring 70 and the extended parts 73a of the pair of stoppers 73 which are positioned on the upper surface of the base body 51 of the pigtail body 50 are sandwiched between the peripheral wall 45 of the receptacle body 40 and the base body 51.

In the optical connector having the configuration as descried above, the front end of the locking part 73b of each stopper 73 which is extended in the direction in which the ferrule assemblies 60 are inserted into the pigtail body 50 and is integral part of the spring 70 is positioned in the recess 63 formed in the ferrule 62.

Figure 5B:
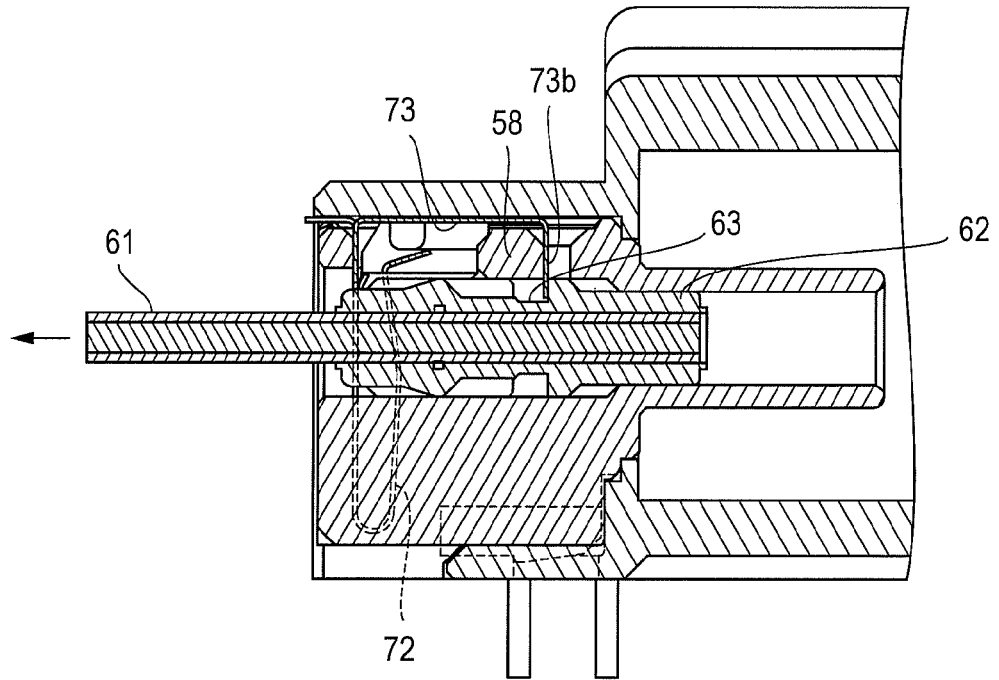
FIG. 5B is a cross-sectional view of the optical connector shown in FIG. 5A in which the optical fiber cable is being pulled.

With this configuration, even though the optical fiber cables 61 are strongly pulled in the direction in which the optical fiber cables 61 are pulled out of the optical connector, the locking parts 73b abut on the wall at the forward end of the recess 63 as shown in FIG. 5B and thereby the movement of the ferrule assemblies 60 in the direction in which the ferrule assemblies 60 are pulled out of the base body 51 is restricted. That is, even when the optical fiber cables 61 are excessively pulled, the optical fiber cables 61 are not pulled out of the optical connector and an excessive displacement does not occur.

Therefore, the pull-out strength of the optical fiber cable 61 out of the optical connector can be significantly improved. Furthermore, the configuration prevents the problem that an excessive displacement of the ferrule assembly 60 increases connection loss and impairs the optical characteristics. In FIG. 5A, "d" indicates the distance over which the ferrule 62 (the ferrule assembly 60) can move.

The extended parts 73a of the stoppers 73 are sandwiched between the peripheral wall 45 of the receptacle body 40 and the base body 51 of the pigtail body 50 so that if the ferrule 62 moves and a force is applied to the locking part 73b as shown in FIG. 5B, the peripheral wall 45 of the receptacle body 40 prevents the stopper 73 from disengaging upward due to the force. Therefore, a good pull-out strength can be ensured. Furthermore, because the sidewall 58 forming one side of the window 55 of the pigtail body 50 is positioned immediately behind the locking part 73b, the sidewall 58 can prevent the locking part 73b from excessively moving backward.

In addition, because the movement of the ferrule 62 is restricted by the distance "d" as described above, even if the optical fiber cable 61 is excessively pulled, for example, the pressing pieces 72 of the spring 70 do not significantly deformed, that is, the pressing pieces 72 are not plastically deformed. Therefore, the pressure strength that presses the ferrule 62 forward is not impaired. This also ensures stable optical characteristics.

Since the stoppers 73 are integral parts of the spring 70 that presses the ferrules 62 forward, the number of parts and the number of assembly steps are not increased. Therefore, the optical connector providing a sufficient pull-out strength of the optical fiber cable 61 can be fabricated at low cost.

What is claimed is:

1. An optical connector comprising:
   a receptacle body including a front opening into which another optical connector is to be inserted and fit and a chamber communicating with the front opening and opened backward, the receptacle body having an engage hole formed in a peripheral wall surrounding the chamber, the engage hole communicating with the chamber;
   a pigtail body including a box-like base body and a receptacle cylinder protruding from a front surface of the base body, the base body being contained in the chamber, the receptacle cylinder being positioned in the front opening, a locking protrusion provided in the base body engaging in the engage hole to attach the pigtail body to the receptacle body;
   a ferrule assembly including an optical fiber cable and a ferrule attached to a terminal of the optical fiber cable, the ferrule assembly being inserted in a container formed and opened backward from a rear of the chamber in the base body, and a front end of the ferrule being inserted and positioned in the receptacle cylinder;
   a spring including a base and a pressing piece extended from one end of the base and bent, the spring made of a plate spring material inserted in the base body through an opening formed in the base body in a direction orthogonal to an insertion direction of the ferrule assembly to communicate with the container, the pressing piece pressing the ferrule forward; wherein
   an L-shaped stopper is formed in the spring as an integral part of the spring;
   the stopper includes an extended part extended from an other end of the base in the insertion direction and a locking part formed by bending an end of the extended part;
   the extended part is sandwiched between the peripheral wall and the base body;
   the locking part passes through a window formed in the base body and is positioned in a recess formed in an outer surface of the ferrule; and
   movement of the ferrule assembly in the direction in which the ferrule assembly is pulled out from the base body is restricted by the locking part positioned in the recess.

2. The optical connector according to claim 1, wherein a pair of the engage holes are formed in opposed surfaces of the peripheral wall and the locking protrusions are provided so as to engage in the engage holes.

3. The optical connector according to claim 1, wherein the base abuts on an internal surface of a back wall of the base body, the back wall forming one side of the opening.

4. The optical connector according to claim 1, wherein a fixing part extending from the other end of the base in a direction opposite to the insertion direction is sandwiched between the peripheral wall and the base body.

5. The optical connector according to claim 1, wherein a notch is formed in the base, the notch being sufficiently large for the optical fiber cable to pass through and for a back end of the ferrule to enter.

6. The optical connector according to claim 1, wherein the pressing piece comprises a pair of legs and connecting part connecting ends of the legs and the legs press a press part formed on and protruding from an outer surface of the ferrule.

* * * * *